Oct. 1, 1957

N. R. STRYKER 2,808,475

LOUDNESS INDICATOR

Filed Oct. 5, 1954

2 Sheets-Sheet 1

INVENTOR
N. R. STRYKER
BY
Walter M. Hill
ATTORNEY

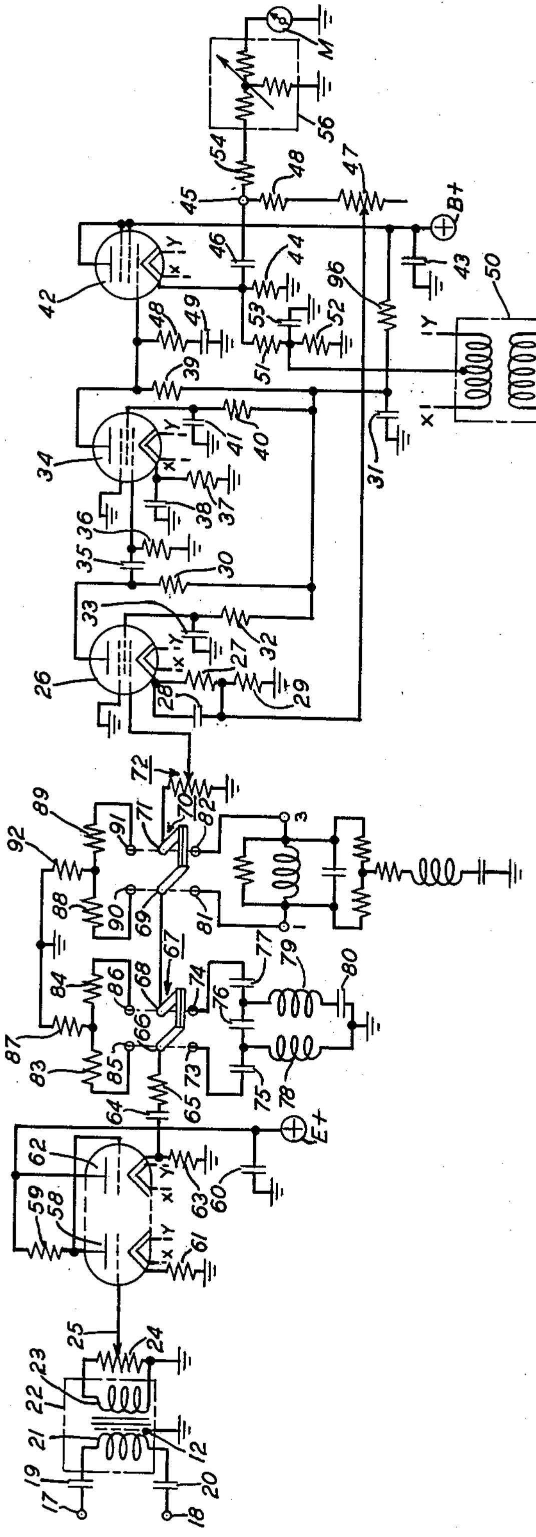
FIG. 5
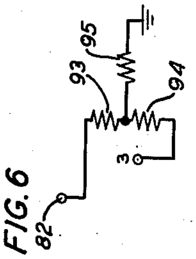
FIG. 6
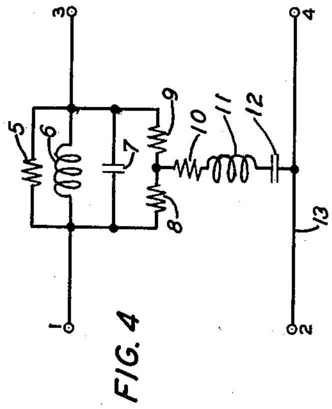
INVENTOR
N. R. STRYKER
BY Walter M. Hill
ATTORNEY

United States Patent Office 2,808,475

Patented Oct. 1, 1957

2,808,475

LOUDNESS INDICATOR

Norman R. Stryker, East Orange, N. J., assignor to Bell Telephone Laboratories, Incorporated, New York, N. Y., a corporation of New York Application October 5, 1954, Serial No. 460,341

7 Claims. (Cl. 179—175)

This invention relates to sound measurement, and especially to direct measurement of the effect of telephone equipment on the loudness of speech transmitted over telephone systems.

The naturalness of speech transmitted over telephone circuits employing present day transmitting and receiving equipment is sufficient to make any slight deviations in or alterations of the characteristics of such equipment of negligible importance in their effect on this speech factor. However, this is not the case as regards the loudness of transmitted speech, so that the loudness transmission characteristic is a factor of considerable importance in the design of improved telephone systems and components. Measurements of the loudness of transmitted speech have heretofore been difficult to make because of the fact that the loudness of a sound is a subjective phenomenon rather than a purely physical one, including as it does the psychological response of the person hearing it. While the intensity of a sound wave can be measured with appropriate instruments, it must be correlated with the experimentally determined average loudness corresponding to the intensity value of each sinusoidal component frequency in the complete frequency spectrum of the sound. The loudnses calculation therefore requires measurement of the frequency spectrum of the sound, and application of involved computational techniques to determine the loudness corresponding to the measured intensity value.

Testing arrangements presently in use for measuring the loudness transmission characteristic of a telephone device in comparison with a reference device frequently rely on actual calling and listening. Considering the testing of a telephone transmitter by this method, for example, a person serving as a "caller" speaks into a standard microphone which is connected into the telephone transmission circuit. Another person serving as a "listener" hears the speech as it is reproduced at his ear by a telephone receiver connected at the other end of the transmission circuit. The listener also has available for manipulation a manually adjustable attenuator connected into the receiving circuit, whereby he can control the volume level of the transmitted speech signal prior to its conversion into sound by the telephone receiver. The caller then switches the transmitter to be tested into the telephone circuit in place of the standard microphone and calls the same speech sounds into it. The listener adjusts the attenuator until the loudness of the sound he then hears seems to him to be the same as the loudness of the sound he heard when the caller used the standard microphone. The change in the attenuator setting, which is usually calibrated in decibels, is a measure of the comparative loudness transmission efficiency of the transmitter under test with respect to the standard microphone. This test is a true measurement of loudness, but since the same sound often seems unequally loud to different listeners, the test must be repeated for a fair sampling of listeners, and the results averaged to get a reliable indication. In addition, the test requires two distinct steps, first using a standard reference instrument, and then using the instrument to be tested. It is therefore apparent that the calling and listening procedure is both time-consuming and cumbersome to apply and interpret.

The need for measuring instruments which would dispense with a listener in loudness testing systems has been recognized, with the result that a variety of types of sound level and volume indicators have been developed. All of these instruments are logarithmic indicators which operate by converting the received speech sound into an electrical voltage signal the amplitude of which has the same wave shape and frequency spectrum as the sound pressure. All of them, in addition, include as a key component a transducer responsive to the pressure the received sound produces in the air about the instrument. The pressure level of sound in decibels is defined as equal to 20 times the logarithm to the base 10 of the ratio of the measured pressure to a reference pressure of 0.0002 dynes/square centimeter. Since sound intensity is proportional to the square of the sound pressure, intensity level in decibels is the same as the pressure level. Consequently, these pressure responsive instruments actually read a quantity proportional to intensity level. As pointed out above, intensity measurements are not directly indicative of loudness. Actual comparison tests have shown that on some telephone systems the discrepancy between transmitted intensity and transmitted loudness may be as high as 10 decibels.

In the past, attempts have been made to adapt such intensity responsive instruments to measure loudness by means of special circuits designed to simulate to some extent the loudness response of the human ear over the audible frequency and intensity ranges. However, due to the wide range of frequencies and intensity levels that may be encountered, a plurality of such circuits covering numerous different ranges must be included in the complete loudness measuring instrument. This results in a complicated nonlinear device which, in addition, only closely simulates the loudness response of the average listener at particular discrete average intensity levels. The accuracy of such instruments rapidly decreases for other intensity levels.

In the article "A proposed loudness efficiency rating for loudspeakers and the determination of system power requirements for enclosures," H. F. Hopkins and N. R. Stryker (the applicant), Proceedings of I. R. E., volume 36, March 1948, pages 315–335, a concept of loudness weighting is developed. For a complete description reference should be made to the article. Briefly, it describes a means whereby a signal having a spectrum of constant intensity over a frequency range of 300 to 3300 cycles per second can be weighted so that a measurement of the pressure resulting from application of the signal to a loudspeaker will be proportional to the loudness of the sound output of the loudspeaker. However, there is no recognition of the possibility of using the loudness weighting concept for developing a measuring instrument which will measure a quantity proportional to the loudness of applied speech spectra. In addition, since speech does not have a constant intensity spectrum, the means described is not adapted for use as a speech sound loudness indicator.

An object of the present invention is to provide a measuring instrument which will respond to a signal representative of speech sound intensity to directly indicate a quantity proportional to the loudness of the signal for all such signals transmitted by telephone systems.

A further object is to provide a speech sound loudness volume indicator which requires only simple linear circuits and which accurately measures the loudness volume of such sound within the frequency and intensity levels transmitted by telephone systems.

A further object is to provide a simple electrical circuit comprising linear components which may be readily incorporated into the circuit of conventional intensity responsive indicators, whereby such indicators will then be enabled to directly indicate a quantity proportional to the loudness of speech sounds over the range of speech sound intensity levels and frequencies transmitted by telephone systems.

The instant invention attains these objects by providing an intensity responsive measuring instrument having a frequency characteristic which is so weighted that when utilized for measuring speech signals transmitted by telephone systems the instrument will indicate a quantity proportional to the loudness of the signals. In a particular embodiment the required weighting is achieved by a novel circuit designated herein as an equalizer. The intensity vs. frequency characteristic of the series combination of the equalizer and the measuring instrument has very nearly the same shape as the loudness vs. frequency characteristic of speech over the entire intensity and frequency range of interest. All circuits employed are simple in construction.

The invention may be completely understood from a reading of the following detailed specification and accompanying drawings in which:

Fig. 4 is a diagram of the circuit of a novel equalizer constructed in accordance with the invention;

Fig. 5 is a diagram of the circuit of a novel loudness volume indicator constructed in accordance with the invention; and Fig. 6 is a diagram of a modification of a portion of the circuit of the loudness volume indicator shown in Fig. 5 for purposes of calibration.

Figure 1:
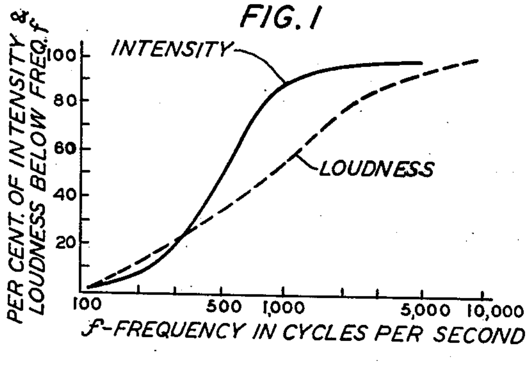
Fig. 1 is a graph showing the percent of intensity and loudness below any sinusoidal component frequency in the frequency spectrum of human speech.

Referring to Fig. 1, there are shown curves representing the percent of sound intensity and loudness below any frequency in the spectrum of human speech. The loudness curve was developed from data obtained by tests on speech sounds having a maximum R. M. S. intensity level of 78 decibels in 0.25-second intervals. This is an average level existing 2.5 feet from the lips of a person talking conversationally. The loudness curve will vary in a nonlinear manner when the average intensity level varies over wide limits. However, it is sound by experimentation that the average intensity level of speech in normal telephone conversation is always within the range of 50 to 110 decibels. In addition, it is an experimental fact that within this range of intensity levels, and within the frequency range transmitted by telephone systems, the average loudness level varies very nearly in proportion to the average intensity level. Accordingly, for application to telephone systems, the complicated nonlinear variation of loudness with intensity can be ignored and the two can be considered proportional. The curves in Fig. 1 can therefore be regarded as correctly representing the relationship between loudness and intensity for all average sound intensity levels encountered in telephony. With this simplification, measurements of intensity can be made indicative of loudness if a suitable correction is made for the fact that the curves in Fig. 1 show a material difference between the intensity and loudness contributions of equal frequency increments. About 96 percent of total intensity is in the frequency range from 100 to 1200 cycles per second while only about 50 percent of total loudness is in that range. Accordingly, any distortion of frequencies above 1200 cycles per second by the telephone transmission system will have no effect on transmitted intensity, but will seriously affect transmitted loudness. Since telephone transmission systems emphasize frequencies in the range of 1000 to 3300 cycles per second in order to improve intelligibility, it is evident that measurements of intensity will not correctly indicate transmitted loudness in the absence of a suitable correction such as the instant invention provides. One allowable simplification derives from recognizing that in the frequency range from 300 to 3300 cycles, which is the range transmitted by existing telephone transmission systems, about 70 percent of total speech loudness is included. Frequencies above 3300 cycles per second only include about 10 percent of total loudness. Hence, while the limiation introduced by the telephone system makes measurements beyond the range from 300 to 3300 cycles per second useless, this range includes a sufficiently great proportion of total loudness so that measurements in that range will be closely indicative (within 0.3 decibel) of loudness over the entire speech frequency band.

Considering Fig. 1, it can be seen that there are 10 frequency bands which contribute equal 10 percent increments to total speech loudness. Of these, 7 bands of equal loudness increments are comprised between 300 and about 3300 cycles per second. The frequency limits of these bands, and of the band immediately below the one including 300 cycles per second are listed in column 1 of the following table:

*Table 1*

| Frequency Band in Cycles (1) | Band Width in Cycles ($\Delta f$) (2) | 10 Log $\Delta f$ (3) | Mid-Frequency in Cycles (4) | 10 Log $\Delta f$−20.9 (5) |
|---|---|---|---|---|
| 170–280 | 110 | 20.41 | 225 | (0 at 300 cycles per second.) |
| 280–410 | 130 | 21.14 | 345 | 0.24 |
| 410–580 | 170 | 22.30 | 495 | 1.40 |
| 580–800 | 220 | 23.42 | 690 | 2.52 |
| 800–1100 | 300 | 24.77 | 950 | 3.87 |
| 1100–1520 | 420 | 26.23 | 1310 | 5.33 |
| 1520–2140 | 620 | 27.92 | 1830 | 7.02 |
| 2140–3300 | 1160 | 30.65 | 2720 | 9.75 |

The total intensity in any frequency band is the product of the bandwidth and the intensity per cycle in that band. For a sound source having a flat intensity spectrum, i. e. constant intensity at all frequencies, the intensity in any frequency band would be proportional to the width of that band. Therefore, to make the intensity increments equal to the loudness increments over the frequency range of 300 to 3300 cycles per second, it would be necessary to attenuate the intensity in each of those bands by an amount proportional to the bandwidth. On a decibel basis, the required attenuation in each band will be 10 times the logarithm to the base 10 of the bandwidth. In column 2 of Table 1 is listed the width of each equal loudness band, and in column 3 is given the required attenuation. Since attenuation circuits are designed to introduce desired attenuations at specific frequencies, the required attenuation should be applied to the mid-frequency of each frequency band. Mid-frequencies are listed in column 4. The required attenuations in column 3 only have significance as relative values, the variation from band to band being the important factor. Hence, these attenuations can be shifted to a basis relative to the attenuation at 300 cycles per second. The attenuation at 300 cycles per second is found by interpolating the required attenuations at the mid-frequencies above and below 300 cycles per second. Doing this, a value of about 20.9 decibels is obtained. Subtracting 20.9 decibels from the values in column 3 gives the required attenuation at each mid-frequency relative to zero attenuation at 300 cycles per second. The resultant values are listed in column 5, and are plotted against frequency as curve B in Fig. 2. This is the required speech sound loudness weighting characteristic for a signal having a flat intensity spectrum, and is the total required weighting of the said source and any measuring device.

Figures 2, 3:
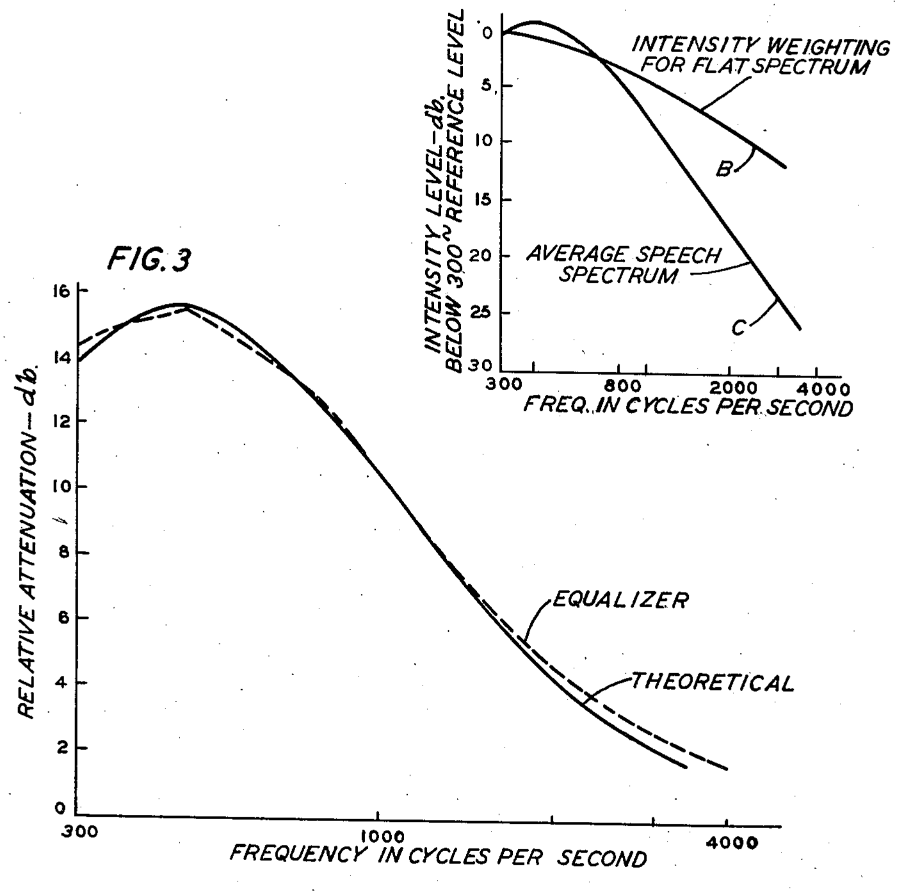
Fig. 2 is a graph showing the frequency variation of the relative intensity level of various spectra pertinent to the invention.
Fig. 3 is a graph of an ideal theoretical attenuation characteristic and the characteristic provided by the novel equalizer.

Curve C in Fig. 2 is a plot of the experimentally measured intensity spectrum of speech sound, relative to the intensity level at 300 cycles per second for each component frequency from 300 to 3300 cycles per second. Since curve B is the overall required characteristic, it is necessary to produce a total attenuation, in decibels, equal to the ordinates of curve B minus the ordinates of curve C at each frequency. At 300 cycles per second the attenuation is zero decibels, while at 3300 cycles per second it is minus 13 decibels. A negative value means that amplification is required. In order to avoid the need for amplification, since relative and not absolute attenuation is the factor involved, the attenuation at 300 cycles per second may be set at a convenient value larger than 13 decibels, such as 14 decibels. By doing this, and increasing the attenuation values at all other frequencies by 14 decibels, the curve denoted "Theoretical" in Fig. 3 is obtained. Any intensity responsive measuring instrument having an attenuation vs. frequency characteristic of the same shape as this theoretical curve would constitute a loudness indicator in accordance with the invention. This theoretical curve is denoted herein as the speech sound loudness weighting characteristic for speech transmitted over telephone systems. It is to be noted that the loudness weighting characteristic has a maximum attenuation at 450 cycles per second. Therefore, one of the characteristics of the novel loudness indicator is that it have a maximum attenuation in the region of 450 cycles per second.

In the case where a conventional voltage responsive meter having a uniform frequency characteristic is to be utilized, such as a volume meter, all of the loudness weighting can be accomplished by a novel electric circuit denoted herein as an "equalizer" connected between the speech signal source and the meter. The sum of the equalizer characteristic and the flat characteristic of the meter will have the same shape as the equalizer characteristic alone, and so will constitute the desired loudness weighting characteristic. The meter readings will be proportional to the speech signal loudness even though the meter responds to signal intensity. If the meter is a volume meter, the reading will be a quantity denoted herein as loudness volume. The circuit diagram of a preferred embodiment of an equalizer having an attenuation characteristic depicted by the curve marked "Equalizer" in Fig. 3 is shown in Fig. 4. As seen, the equalizer characteristic very nearly approximates the theoretical characteristic over the desired frequency range of 300 to 3300 cycles per second.

Referring to Fig. 4, the input terminals of the equalizer circuit are 1—2. The output terminals are 3—4. Between terminal 1 and terminal 3 there is connected a parallel resonant circuit comprising resistor 5, inductor 6 and condenser 7. Shunting condenser 7 is a T network of which each arm is, respectively, a resistor 8 and a resistor 9 equal in value. The leg of the T network, one terminal of which is connected to the junction point of resistors 8 and 9, is a series resonant circuit comprising a resistor 10, an inductor 11 and a condenser 12. The other terminal of this series combination, which is the free terminal of condenser 12, is connected to a common conductor 13 joining terminals 2 and 4. When the equalizer is connected into the circuit of a complete loudness indicator wherein ground is utilized as a common potential level, conductor 13 may be omitted by utilizing ground as the common conductor. In that case, terminals 2 and 4 would be omitted, and the free terminal of condenser 12 would be connected to ground.

The circuit depicted in Fig. 4 may be easily and conveniently constructed, since it comprises only a few circuit elements all of which are linear. While many types of circuits may be developed by those skilled in the art which will have a frequency selective attenuation characteristic corresponding to the described speech sound loudness weighting characteristic, all of them would come within the teaching of the instant invention. One set of specific values of the circuit components shown in the preferred embodiment depicted in Fig. 4, which will provide this desired characteristic, are tabulated as follows:

| | | |
|---|---|---|
| Condensers No. **7** | microfarads | .0715 |
| Condensers No. **12** | do | 1.74 |
| Inductors No. **6** | henries | 1.74 |
| Inductors No. **11** | do | .0715 |
| Resistors No. **5** | ohms | 4900 |
| Resistors No. **8** | do | 1000 |
| Resistors No. **9** | do | 1000 |
| Resistors No. **10** | do | 200 |

In Fig. 5 is shown the circuit of a specific embodiment of a loudness volume indicator in accordance with the invention. It comprises the equalizer connected to an audio amplifier utilizing a conventional feedback circuit to obtain stabilized response characteristics. The amplifier output is applied to a volume meter having a flat frequency response and which indicates in decibels the volume of the applied signal. A commercially available and very well-known meter of this kind in the VU meter. A complete description of it is given in the article "New standard volume indicator and reference level," Electronics, volume 12, page 28, February 1939. The meter reads the average of the RMS values of the signal applied to it, in decibels relative to a reference level of one milliwatt of 1000 cycles per second power in a 600-ohm impedance in approximately 0.25-second intervals.

The input terminals of the loudness volume indicator are at 17 and 18. The speech signal voltage to be measured would be applied across those terminals. Terminals 17 and 18 are connected across primary winding 21 of input transformer 22 through blocking condensers 19 and 20. Secondary winding 23 of transformer 22 is connected across a resistor 24 which is grounded at one end. Resistor 24 may be of the order of 100,000 ohms, thereby resulting in a very high input impedance at terminals 17 and 18. This is important in order that the indicator have negligible effect on the telephone circuit to which it may be connected. Transformer 22 serves to isolate the direct-current ground level potentials of the telephone circuit and the indicator, since these potentials may differ. A grounded electrostatic shield 12 is preferably interposed between windings 21 and 23 to prevent capacitive coupling of the windings. Transformer 22 may have a voltage step-up ratio from primary to secondary to increase the sensitivity of the indicator. However, this should not be so great that the corresponding impedance step-up ratio results in less than about 8000-ohms input impedance across terminals 17 and 18. This is in view of the fact that telephone circuits usually have impedance of about 600 ohms, and the indicator should have an input impedance in the neighborhood of 10 times as great.

Resistor 24 is tapped by a manually adjustable brush 25 connected to the grid of triode 58 which serves as an amplifier to compensate for the attenuation produced by the equalizer. Brush 25 may be adjusted for a desired indicator sensitivity depending on the range of intensity levels and loudness of the input signals to be measured. Triode 58 has a plate load resistor 59 and is supplied with positive direct-current plate potential from source E+. A condenser 60 provides an alternating-current ground return path for the plate current of triode 58. The cathode of tube 58 is connected to ground through a cathode biasing resistor 61, which is unbypassed in order to provide a degree of degenerative feedback to stabilize the amplification produced by the circuit comprising tube 58, which should have a flat frequency response from 100 to 3300 cycles per second and more preferably to 6000 cycles per second. The amplified signal appears at the plate of tube 58, which is directly connected to the grid of a second triode 62 connected to serve as a cathode follower for coupling the high output impedance of tube 58 to the reltaively low input impedance of the equalizer and associated circuits. Triodes 58 and 62 may be conveniently contained in one envelope. The plate of triode 62 is supplied with positive direct-current potential from source E+. The cathode of tube 62 is connected to one terminal of a cathode load resistor 63 which is grounded at its other terminal. The output of tube 62 appears at its cathode, and is taken out via the series combination of blocking condenser 64 and current limiting resistor 65 connected at one terminal to the cathode of tube 62 and at the other terminal to pole 66 of a double pole, double-throw switch 67. The other pole 68 of switch 67 is connected to pole 69 of a second double pole, double-throw switch 70. The other pole 71 of switch 70 is connected to one terminal of a potentiometer 72 which is grounded at its other terminal. The brush of potentiometer 72 is connected to the control grid of a pentode 26. The lower terminals 73 and 74 of switch 67 are connected across the terminals of the series combintaion of three condensers 75, 76 and 77, condenser 76 being in the middle. The junction of condensers 75 and 76 is connected to the terminal of an inductor 78 which is grounded at its other terminal. The junction of condensers 76 and 77 is connected to one terminal of an inductor 79 which is connected at its other terminal to one terminal of a condenser 80, the other terminal of which is grounded. The complete circuit thus connected to terminals 73 and 74 of switch 67 comprises a high-pass filter which may be designed to eliminate, or at least greatly attenuate, frequencies below about 300 cycles per second. This prevents power supply and circuit noise in the frequency range below that of interest from effecting the indication of the VU meter, and has been found to result in improved performance of the complete loudness indicator.

The lower terminals 81 and 82 of switch 70 are connected, respectively, to the terminals 1 and 3, respectively, of the equalizer described in more detail above with reference to Fig. 4. The circuit of Fig. 4 is reproduced in Fig. 5 to show the precise manner of its connection to switch 70.

The circuitry connected to the upper terminals of switches 67 and 70 is provided in order to permit ready conversion of the novel loudness volume indicator to a conventional volume indicator. The 300 cycles per second high-pass filter connected to the lower terminals of switch 67 introduces a loss of approximately 0.3 decibel at 300 cycles per second and above. In order not to affect the calibration of the volume indicator when the filter is not used, it is necessary to insert in place of the filter a circuit which will introduce a constant loss of about 0.3 decibel over the entire frequency range to be covered. A resistive T attenuator pad providing this amount of loss is, therefore, connected to the upper terminals of switch 67. This pad comprises series connected resistors 83 and 84 connected across upper terminals 85 and 86 of switch 67. A resistor 87 is connected between ground and the junction of resistors 83 and 84. Accordingly, no matter whether switch 67 is thrown up or down the resultant attenuation introduced will remain the same. The only difference will be that no filtering of frequencies below 300 cycles per second will occur when the switch is thrown up.

In the case of the equalizer circuit connected to the lower terminals of switch 70, exact simulation of the attenuation it introduces at all frequencies, but without any loudness weighting effect, would be impossible due to the fact that the attenuation variation with frequency is the source of the loudness weighting. However, the maximum attenuation introduced by the equalizer occurs at about 450 cycles per second and the amplification produced by triode 58 is such that it compensates for that degree of attenuation. Simulation of the effect of the equalizer circuit, therefore, may be achieved by connecting the upper terminals of switch 70 to a resistive T attenuator pad which introduces the same degree of attenuation. Therefore, series connected resistors 88 and 89 are connected across the upper terminals 90 and 91 of switch 70. A resistor 92 is connected between ground and the junction point of resistors 88 and 89. Consequently, when switch 70 is thrown up the equalizer is replaced by a circuit which introduces a constant attenuation at all frequencies, this attenuation corresponding to the attenuation which the equalizer would introduce at 450 cycles per second.

The function of triode 58 is to introduce enough uniform amplification to compensate for the attenuation produced by the circuits connected to switches 67 and 70. The amplification required for bringing the signal level within the range of good sensitivity of the VU meter is provided by the feedback amplifier comprising pentodes 26, 34 and 42. For linear operation of those pentodes, the voltage at the control grid of pentode 26 should not be excessive. The preferred operating condition is for the voltage at that point to be equal to the voltage at the grid of triode 58. When the equalizer is connected in the circuit by throwing switch 70 down, this condition cannot be attained at all frequencies due to the variation of attenuation with frequency. However, the equalizer introduces maximum attenuation at about 450 cycles per second. Also, this attenuation is inserted at all frequencies when switch 70 is thrown up. The best approach to the desired condition is to set potentiometer 72 so that the voltage at its brush is equal to the voltage at the grid of triode 58 when switches 67 and 70 are thrown down and a 450-cycle per second signal voltage is applied across terminals 17 and 18.

The cathode of pentode 26 is connected through the parallel combination of cathode biasing resistor 27 and condenser 28 to a terminal of a resistor 29 which is grounded at its other terminal. Resistor 29 is part of a feedback loop which will be described further below. The suppressor grid of pentode 26 is grounded. The plate is connected to one terminal of a plate load resistor 30, the other terminal of which is connected through a voltage dropping resistor 96 to a souce B+ of positive direct-current potential with respect to ground. Voltage dropping resistor 96 is by-passed to ground for alternating current by a condenser 31. The screen grid of pentode 26 is connected to one terminal of a screen current limiting resistor 32, the other terminal of which is connected through resistor 96 to source B+. The terminal of resistor 32 which is connected to the screen grid of tube 26 is also connected to one terminal of a condenser 33, the other terminal of which is grounded. Condenser 33 provides an alternating-current ground return path for signals appearing at the screen grid of tube 26. With this circuit configuration pentode 26 serves as a first stage of amplification of the signal applied to its control grid. Pentode 26 operates as a class A amplifier having a flat frequency response from 300 to 3300 cycles per second and more preferably to 6000 cycles per second. Hence, an undistorted amplified replica of the signal voltage at the control grid is produced at the plate of pentode 26.

Since a single stage of amplification may not be adequate for the low level signals encountered in testing telephone circuits, a second stage of amplification comprising pentode 34 is provided. The plate of pentode 26 is connected to one terminal of coupling condenser 35, the other terminal of which is connected to the control grid of pentode 34, which is preferably a pentode of the same type as pentode 26. The control grid of pentode 34 is also connected to one terminal of a grid leak resistor 36, the other terminal of which is grounded. Pentode 34 is provided with cathode bias by the connection of its cathode to one terminal of the parallel combination of resistor 37 and condenser 38, the other terminal of this parallel combination being grounded. Pentode 34 has a suppressor grid which is grounded. The plate is connected to one terminal of a plate load resistor 39, the other terminal of that resistor being connected through resistor 96 to source B+. The screen grid is connected to one terminal of a screen current limiting resistor 40, the other terminal of this resistor being connected through resistor 96 to source B+. The terminal of resistor 40 which is connected to the screen grid is also connected to one terminal of a condenser 41, the other terminal of that condenser being grounded. Condenser 41 serves the same purpose for pentode 34 as condenser 33 serves for pentode 26. Pentode 34 operates as a class A amplifier having a flat frequency response from 300 to 3300 cycles per second and more preferably to 6000 cycles per second. Hence, the output at its plate is an undistorted replica of the input signal. The plate is directly connected to the control grid of an electron tube 42 which serves as a cathode-follower output stage.

Tube 42 is a pentode of the same type as pentodes 26 and 34, but for simplicity of circuit design its screen and suppressor grids are connected to its plate so that it operates as a triode. The plate of tube 42 is directly connected to source B+. The plate is also connected to one terminal of a condenser 43, the other terminal of which is grounded. Condenser 43 provides an alternating-current ground return path for the plate current. Tube 42 has a cathode connected to one terminal of a resistor 44, the other terminal of which is grounded. By proper choice of the potential of source B+ and the magnitude of resistor 44, the direct-current cathode voltage of tube 42 can be brought to approximately the same level as the direct-current plate voltage of pentode 34, thereby permitting the direct coupling between the plate of pentode 34 and the control grid of tube 42. This direct coupling, in which the usual blocking condenser is omitted, has an advantage in that it helps to prevent the tendency of the feedback loop described below to oscillate at low frequencies. The output of tube 42 appears across resistor 44, and is brought to output terminal 45 through direct-current blocking condenser 46 connected between terminal 45 and the ungrounded terminal of resistor 44.

The VU meter has an input impedance of about 3900 ohms. For reasons explained below, the input impedance at terminal 45 should be low. The output impedance of a cathode-follower circuit is itself normally low. In Fig. 5 a feedback loop is provided which still further reduces the output impedance of the cathode-follower circuit, and also stabilizes the net amplification produced by tubes 26 and 34 at a constant value regardless of small changes in the characteristics of these tubes with age. The feedback potential is derived from the brush of a potentiometer 47 connected to output terminal 45 through a resistor 48. By adjusting potentiometer 47, a desired fraction of the output voltage at terminal 45 is applied back as negative feedback voltage across resistor 29 in the cathode ground return path of pentode 26.

In establishing a suitable design for the feedback circuit, care must be taken to prevent oscillation from occurring at the high and low ends of the range of frequencies which the amplifier is designed to handle. As is well known, if the amplification falls off to rapidly at either the high or low frequencies, oscillation may result due to a phase shift of 360 degrees in the feedback loop before the net loop gain drops below unity. As stated above, one of the circuit characteristics which helps to prevent this is omission of a coupling condenser between the plate of pentode 34 and the control grid of tube 42. An additional one is the connection of the series combination of resistor 48 and condenser 49 between the control grid of tube 42 and ground. Condenser 49 and resistor 48 are relatively small, of the order of 60 micromicrofarads and 24,000 ohms, respectively. They contribute to shaping the loop gain high frequency cutoff so that the gain of the feedback loop will have dropped below unity before the total phase shift in the loop reaches 360 degrees.

Since the cathode of tube 42 may be as much as 125 volts above ground potential, leakage current might flow between the cathode of tube 42 and its heater, with resultant possible oscillation, if the heater is at direct-current ground potential. The terminals of the heater of tube 42 are designated at X—Y. These terminals are connected (not shown) to corresponding terminals X—Y of the output winding of a heater supply transformer 50 having its input winding connected to a suitable source of alternating-current power. It is desirable to be able to supply power to the heaters of all tubes in the volume indicator circuit from a common heater supply. That is, the terminals of the heaters of tubes 26 and 34 should also be connected to terminals X—Y of the output winding of heater supply transformer 50. Thus, in Fig. 5 the terminals of the heaters of tubes 26 and 34 have also been designated X—Y. With these heater connections, the most preferable arrangement is for the output winding of heater supply transformer 50 to be at a direct-current potential approximately mid-way between the relatively high direct-current potential of the cathode of tube 42 and the low direct-current potentials of the cathodes of tubes 26 and 34. To establish this condition, the series connected resistors 51 and 52 are connected between ground and the cathode of tube 42. Resistors 51 and 52 are equal in value, so that if a potential of about 125 volts exists at the cathode of tube 42 a potential only half as great will exist at the junction point of resistors 51 and 52. This junction point is connected to the mid-point of the secondary winding of heater transformer 50, which may thereby be placed at a direct-current potential of about 62 volts. A condenser 53 is connected between ground and the junction point of resistors 51 and 52 to by-pass the alternating-current potential of the cathode of tube 42 around transformer 50. The net result is that the potential difference between the heaters and cathodes of tubes 26, 34 and 42 will in no case be greater than about 62 volts. For most electron tubes this is not so high to cause oscillation due to coupling between the cathode and heater. This is the case for the type 6AU6 pentode, which may be the type utilized as each of the tubes 26, 34 and 42.

At terminal 45 there will appear an amplified replica of the speech signal voltage applied across input terminals 17 and 18. The loudness volume of this signal voltage may be measured by the VU meter designated at M. The input impedance of the VU meter is about 3900 ohms. To achieve proper dynamic behavior of the scale pointer, the signal source to which the meter is connected should have the same impedance. Since, as previously explained, the output impedance of the cathode follower at terminal 45 is very low, the required impedance relationship could be attained by directly connecting meter M to terminal 45 through 3900-ohm resistor 54. The combination of the cathode follower and feedback circuits will make the effect of variations in the characteristics of pentodes 26, 34 and 42 on the impedance seen by meter M negligible. To permit control over the sensitivity of meter M without upsetting the impedance relationship, a resistive T attenuator 56 having constant input and output impedances of 3900 ohms is connected between meter M and resistor 54, and resistor 54 is connected to terminal 45. Attenuator 56 may be manually variable in 10 calibrated steps of 0.1 decibel each.

The net gain of the amplifier comprising tubes 26, 34 and 42 may be approximately 60 decibels. To calibrate the loudness volume indicator, switches 67 and 70 are thrown down and a power source having a 600-ohm impedance is adjusted to deliver 60 decibels below 1 milliwatt of 1000 cycles per second power into a 600-ohm resistor connected across input terminals 17 and 18. Attenuator 56 is set for least attenuation, and the brush of potentiometer 47 is adjusted until meter M reads zero. The setting of attenuator 56, which is variable in known decibel steps, is then equivalent to an input signal loudness volume of −60 volume units (VU). Potentiometer 47 thus serves as a zeroing adjustment for the amplifier comprising tubes 26, 34 and 42, since increasing the feedback voltage serves to reduce the net gain of this amplifier.

Since the attenuation produced by the equalizer decreases with increasing frequency above 450 cycles per second, while the resistive T attenuator pad connected to the upper terminals of switch 70 has a constant attenuation corresponding to that of the equalizer at 450 cycles per second, the calibration of the indicator when the equalizer is connected in the circuit will differ somewhat from the calibration when the attenuator pad is connected in the circuit. One possibility of correcting for this in calibrating the VU meter is to twice calibrate attenuator 56 in the manner described above, once when switch 70 is down and again when it is up. Two separate calibration scales would then have to be utilized in conjunction with attenuator 56. A simpler procedure, applicable in light of the fact that the indicator is to be used for measuring the volume of speech signals, is to apply a speech signal across input terminals 17 and 18 of the indicator covering the frequency band of 300 to 6000 cycles per second. Since such a frequency band comprises virtually all intensity and loudness, measurements of intensity and of loudness should produce the same reading on the VU meter if the amplifiers have a flat frequency response over this range. As stated above, this is the preferred characteristic of the amplifiers comprising tubes 58, 26 and 34. Accordingly, having applied such a speech signal, it is only necessary to observe how much the VU meter reading when switch 70 is down exceeds the reading when it is up. Then, a simple resistive T attenuator pad introducing an attenuation equal to that excess may be included in the connection between output terminal 3 of the equalizer and terminal 82 of switch 70. This modification of the circuit of Fig. 5 is depicted in the circuit shown in Fig. 6, wherein terminals numbered 3 and 82 are those shown in Fig. 5. Connected in series between terminals 3 and 82 are resistors 93 and 94. A resistor 95 is connected between ground and the junction point of resistors 93 and 94. Resistors 93, 94 and 95 constitute a pad which may have such attenuation that with a calibrating speech signal of a kind described the VU meter reads the same no matter whether switch 70 is thrown upward or downward. A pad attenuation of 5.5 decibels has been found to produce this result.

While a wide variety of values may be chosen in accordance with the broad teachings of the invention for the circuit elements shown in Fig. 5, the following tabulated circuit component values have been actually found to provide good operating results:

| Resistors, No.: | Ohms |
|---|---|
| 24 | 100,000 |
| 27 | 560 |
| 29 | 2 |
| 30 | $10^5$ |
| 32 | $3.3\times10^5$ |
| 36 | $10^6$ |
| 37 | 560 |
| 39 | $10^5$ |
| 40 | $3.3\times10^5$ |
| 44 | 18,000 |
| 47 (potentiometer total) | 600 |
| 48 | 2,500 |
| 51 | 75,000 |
| 52 | 75,000 |
| 54 | 3,900 |
| 59 | 82,000 |
| 61 | 390 |
| 63 | 36,000 |
| 65 | 300 |
| 72 (potentiometer total) | 1,000 |
| 83 | 17.2 |
| 84 | 17.2 |
| 87 | 29,000 |
| 88 | 710 |
| 89 | 710 |
| 92 | 348 |
| 96 | 9,100 |

| Capacitors, No.: | Microfarads |
|---|---|
| 19 | 1 |
| 20 | 1 |
| 28 | 1,000 |
| 31 | 20 |
| 33 | 4 |
| 35 | 0.25 |
| 38 | 25 |
| 41 | 0.1 |
| 43 | 20 |
| 46 | 4 |
| 49 | $62\times10^{-6}$ |
| 53 | 0.4 |
| 60 | 20 |
| 64 | 2 |
| 75 | 0.64 |
| 76 | 0.4 |
| 77 | 1.06 |
| 80 | 1.19 |

| Inductors: | Inductance in henries |
|---|---|
| 78 | 0.318 |
| 79 | 0.53 |

Tubes 26 and 34: each a type 6AU6 operated at 120 volts plate potential to ground.

Tube 42: type 6AU6 operated at 345 volts plate potential to ground.

Tubes 58 and 62: both halves of type 12AT7 double triode, with tube 58 operated at 84 volts plate potential to ground and tube 62 operated at 300 volts plate potential to ground.

What is claimed is:

1. An indicator of the loudness of speech signals transmitted by telephone systems, comprising an input circuit to which said speech signals are applied, a meter adapted to respond to the intensity of speech signals applied to it, and an equalizer coupling said input circuit to said meter, said equalizer operative to so weight each sinusoidal component frequency comprised in said speech signals that the transmission therethrough at any such component frequency will be proportional to the percent of total loudness below that frequency in said speech signals.

2. The invention described in claim 1, characterized further in that said equalizer has a maximum attenuation at a frequency in the region of 450 cycles per second, and said meter has a uniform frequency response over a range comprising 300 to 3300 cycles per second.

3. In a device responsive to signals representative of the intensity of speech sound in the intensity and frequency ranges normally transmitted by telephone systems, an intensity responsive utilization device, an equalizer to which said signals may be applied, said equalizer connected to said utilization device, said equalizer operative to selectively attenuate the intensity of each sinusoidal component frequency in said signal so that the transmission therethrough at any such frequency is closely proportional to the percent of total loudness below that frequency in said signals.

4. In an indicator of the loudness of a signal representative of the intensity of speech sounds transmitted by telephone systems, an equalizer comprising an input terminal, an output terminal and a common terminal, a parallel resonant circuit connected between said input terminal and said output terminal, said parallel resonant circuit shunted by a T network comprising resistive arms and a series resonant leg, said series resonant leg connected to said common terminal, said equalizer having a maximum attenuation in the region of 450 cycles per second.

5. An indicator of the loudness volume of signals having an intensity versus component frequency characteristic corresponding to that of speech sounds normally transmitted by telephone systems, comprising an input stage to which said signals are applied, an amplifying stage, a metering stage, means for interconnecting said input stage with said amplifying stage and said amplifying stage with said metering stage, said means comprising an equalizer having an intensity versus frequency characteristic such that the percent of the intensity of said signals transmitted by said equalizer below any component frequency in said signals will be substantially the same as the percent of loudness below that component frequency in said signals.

6. The invention described in claim 5, characterized further in that said equalizer comprises an input terminal, an output terminal and a common terminal, a parallel resonant circuit connected between said input terminal and said output terminal, said parallel resonant circuit shunted by a T network comprising resistive arms and a series resonant leg, and said series resonant leg connected to said common terminal.

7. A loudness volume indicator for a speech signal which includes sinusoidal frequency components existing within a band of approximately 300 to 3300 cycles per second, comprising an input coupling stage to which said speech signal is applied, a series of amplifiers having a uniform frequency response over a range including 300 to 3300 cycles per second, means for connecting said amplifiers to said input coupling stage, said means including an equalizer responsive to the intensity of each frequency component in said speech signal to provide a loudness weighted signal wherein the percent of total intensity below any frequency component in said loudness weighted signal approximates the percent of total loudness below that frequency component in said speech signal, an output circuit connected to said amplifier, an intensity responsive volume meter, and means connecting said volume meter to said output circuit.

No references cited.